No. 677,682. Patented July 2, 1901.
E. L. MORSE.
COASTER BRAKE FOR BICYCLES.
(Application filed May 3, 1901.)
(No Model.)

Witnesses:
J. B. Smith
G. F. Riley

Inventor:
Ernest L. Morse
by Henry W. Mason
Atty.

UNITED STATES PATENT OFFICE.

ERNEST L. MORSE, OF NEW BEDFORD, MASSACHUSETTS.

COASTER-BRAKE FOR BICYCLES.

SPECIFICATION forming part of Letters Patent No. 677,682, dated July 2, 1901.

Application filed May 3, 1901. Serial No. 58,651. (No model.)

*To all whom it may concern:*

Be it known that I, ERNEST L. MORSE, a citizen of the United States of America, residing at New Bedford, in the county of Bristol and State of Massachusetts, have invented certain new and useful Improvements in Coaster-Brakes for Bicycles, of which the following is a specification.

My invention relates to that class of devices which when applied to a bicycle allows the propelling-wheel of the same to revolve in a forward direction while the pedals are at rest and which when the pedals are moved in a backward direction retards the motion of the bicycle or brings it to a stop.

The accompanying drawings illustrate my invention, in which—

Figure 1:
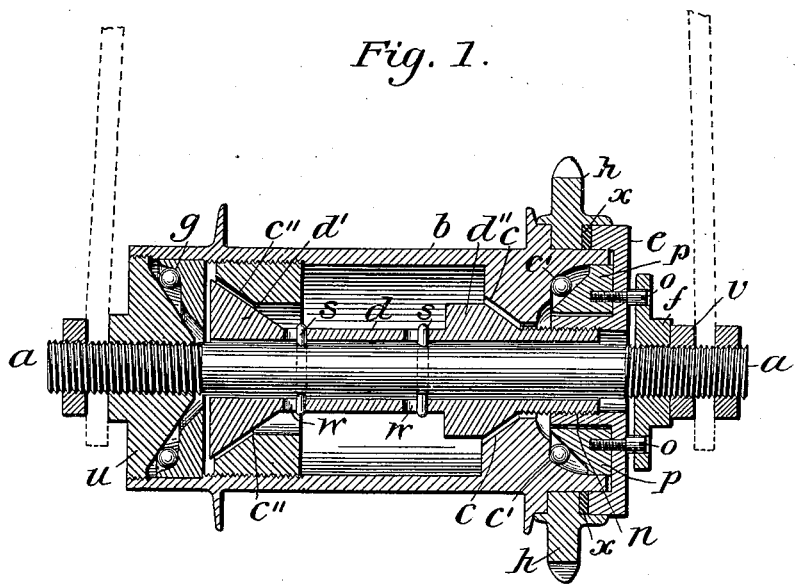
Figure 2:
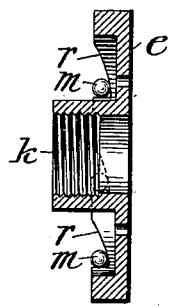
Figure 3:
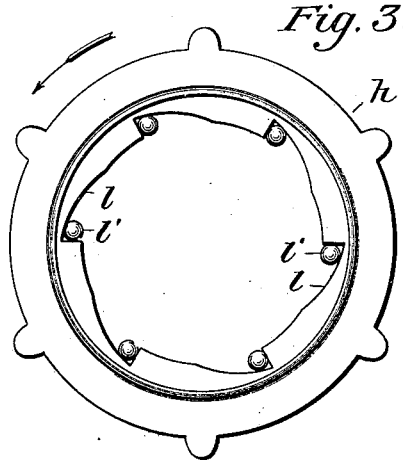

Figure 1 is a rear view, in longitudinal section, of the hub of the propelling-wheel of a bicycle embodying my invention. Fig. 2 is a view in vertical section of one of the operating parts; and Fig. 3 is a side view of the sprocket, showing its construction.

Similar letters refer to like parts in the several views.

The letter $a$ represents the stationary shaft of the propelling-wheel.

$b$ is the outer shell of the hub, having the inwardly-projecting inclined surface $c$ and the ball-cup $c'$ integral therewith.

$c''$ is an inclined surface which is screwed within the hub to a shoulder.

$d$ is a sleeve adapted to slide laterally on the shaft $a$ and having the cones $d'$ and $d''$ integral therewith, adapted to bear against the inclined surfaces $c$ and $c''$ at certain times to cause friction. Said sleeve is prevented from turning on the shaft $a$ when the said cones and inclines are in frictional contact by the pins $s$ passing through the shaft $a$ and into the elongated holes $w$ $w$ in said sleeve $d$, which holes allow the sleeve to have a lateral motion on the shaft $a$.

$g$ is a ball-cup, which is forced to a shoulder in the hub $b$.

$u$ is a cone, which is screwed on the shaft $a$ as a bearing for the balls in the ball-cup $g$.

$h$ is the sprocket, having the inclines $l$ on its inner diameter adapted to receive the balls $l'$, and is mounted on the hub, so that when revolved in a forward direction the balls $l'$ act as a clutch and revolve the hub in the same direction; but when the sprocket is held in a state of rest the hub $b$ is free to revolve in a forward direction.

$k$ is a sleeve interiorly screw-threaded, having the cupped flange $e$, the edge of which is provided with the inclines $r$, adapted to receive the balls $m$.

$p$ is a cone adapted to bear against the balls in the ball-cup $c'$ and is screwed to the flange $e$ by the screws $o$.

$o$ $o$ are shouldered screws seated in the flange $e$, the outer ends of which are adapted to have a lateral motion through apertures in the flanged nut $f$, which nut is held in place on the shaft $a$ by the jam-nut $v$, and thus holds the flanged sleeve $k$ rigid with the shaft $a$. The interiorly-threaded sleeve $k$ takes onto the threaded end $n$ of the sleeve $d$ and is so adjusted thereon that the cones on the sleeve $d$ are just out of contact with the inclines $c$ and $c''$ when the balls $m$ are also just out of contact with the washer $x$, which is interposed between the said balls and the side of the sprocket $h$. The sleeve $d$, the flanged sleeve $k$, and the flanged nut $f$ when adjusted are held in the said positions relatively by the jam-nut $v$.

The operation of the device is as follows: When the sprocket is revolved in a forward direction, the balls $l'$ between the sprocket $h$ and the hub $b$ act as a clutch and revolve the hub in the same direction. When it is desired to coast, the sprocket is held in a stationary position and the hub revolves freely. When it is desired to retard the motion of the wheel or bring it to a stop, the sprocket is revolved slightly in a backward direction. This action causes the balls $m$ to roll up the inclines $r$, and thereby forces the flanged sleeve to the right, taking with it the sleeve $d$, and thus brings the cones $d'$ and $d''$ into frictional contact with the inclined surfaces $c$ and $c''$, thus retarding the motion of the wheel or bringing it to a full stop, according as a greater or less force is used in back-pedaling.

Having thus described my invention, what I claim, and desire to secure by Letters Patent, is—

A coaster-brake for bicycles, comprising a stationary shaft supported in the frame of the bicycle; a sleeve, having one or more friction-cones integral therewith adapted to have a longitudinal motion on said shaft; a hub having inclined surfaces projecting inwardly therefrom adapted to engage said friction-cones; a sprocket fitting on said hub, having its inner diameter provided with inclines and balls, acting as a clutch to revolve the hub with the sprocket, when revolved in a forward direction; a cup-flanged sleeve, adapted to take onto the cone-sleeve and be adjusted thereon, the edge of said cup-flange having inclines provided with balls adapted to bear against a washer interposed between said balls and the side of said sprocket; screws, seated in the flange of said sleeve, having their outer ends adapted to have a longitudinal motion through apertures in a flanged nut adjustably secured to said shaft; and the usual ball-cups, balls, and cones, on which the hub revolves, substantially as shown and described.

Signed by me at New Bedford, Massachusetts, this 16th day of April, 1901.

ERNEST L. MORSE.

Witnesses:
EDWARD P. HASKELL,
EDWIN V. BURKE.